United States Patent [19]

Suzuki et al.

[11] 3,979,526

[45] Sept. 7, 1976

[54] METHOD OF MANUFACTURING WHIPPING CREAM

[75] Inventors: Masao Suzuki; Mitunobu Teshiba, both of Akishima; Fumio Hara, Hinode, all of Japan

[73] Assignee: The Glico Kyodo Nyugyo Kabushiki Kaisha, Tokyo, Japan

[22] Filed: Jan. 31, 1974

[21] Appl. No.: 438,289

[30] Foreign Application Priority Data

Mar. 10, 1973 Japan............................. 48-28394

[52] U.S. Cl............................... 426/570; 426/580; 426/585; 426/613; 426/491

[51] Int. Cl.²........................................ A23C 13/12

[58] Field of Search .......... 426/163, 189, 195, 356, 426/362

[56] References Cited
UNITED STATES PATENTS 3,224,883  12/1965  Pader et al..................... 426/163 X
3,423,211  1/1969  Miles, Jr. et al.................. 426/163

*Primary Examiner*—A. Louis Monacell
*Assistant Examiner*—R. A. Yoncoskie
*Attorney, Agent, or Firm*—Moonray Kojima

[57] ABSTRACT

A method of preparing whipping cream comprising the steps of partially removing low molecular weight material from animal milk with a semipermeable membrane or a molecular sieve having capability of screening up to 10,000 molecular weight, to concentrate the non-fat solid content of animal milk to 14.5 to 30 weight percent; homogeneously mixing 50 to 70 parts by weight of the animal milk thus obtained and 50 to 15 parts by weight of an oil or fat; and emulsifying the mixture; and products of such method.

7 Claims, 1 Drawing Figure

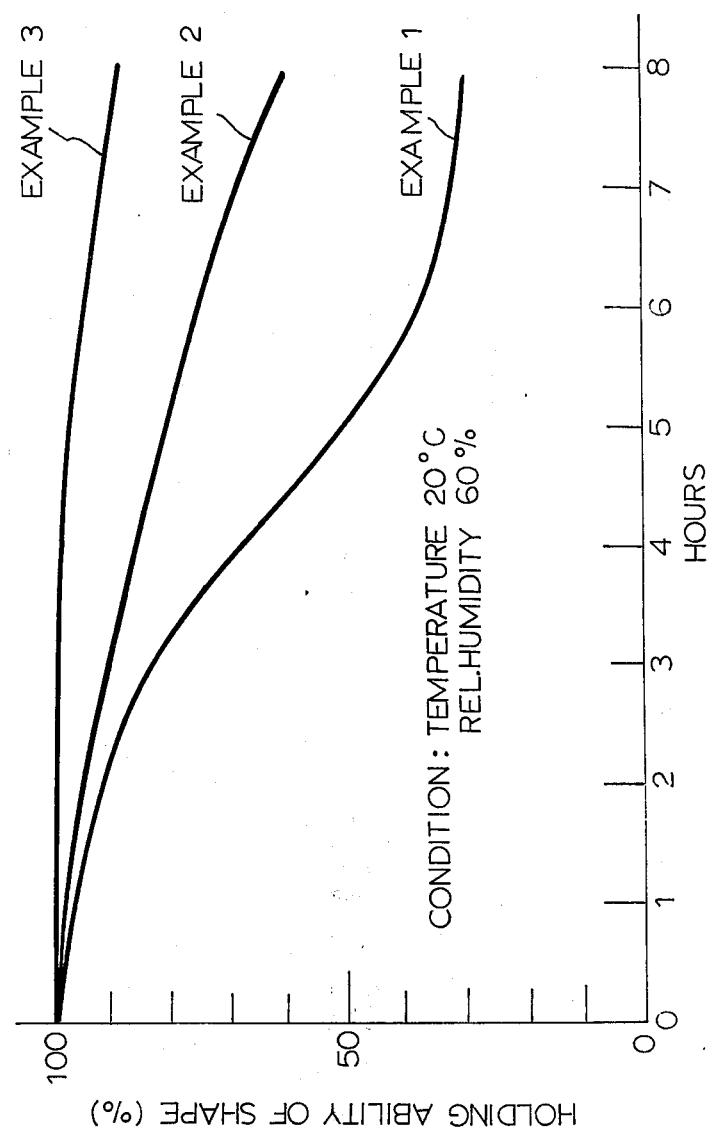

METHOD OF MANUFACTURING WHIPPING CREAM

BACKGROUND OF THE INVENTION

This invention relates to a method of manufacturing whipping cream. The term "whipping" as used herein means stirring fine, numerous air bubbles into the intended system.

Heretofore, whipping cream was prepared by stirring fresh cream (which cream is the result of centrifuging animal milk and comprises products rich in fat content), margarine, or a combination of these materials with sugar, etc. These products, however, are generally poor in flavor, and are much too costly for widespread commercial appeal. Because of their unsatisfactory whipping property, other properties related thereto, such as for example condition of air bubbles being contained, the property of retaining the whipped state, etc, are also not satisfactory. Moreover, due to the excessive content of fats, or small content of protein the taste attributable to these products is too thick for most purposes. Moreover, there are other defects.

SUMMARY OF THE INVENTION

The present invention aims to eliminate or reduce the foregoing and other shortcomings and disadvantages of the prior art.

Briefly, the invention encompasses a method of preparing whipping cream and comprises the steps of at least partially removing low molecular weight matter or material from animal milk with a semipermeable membrane or a molecular sieve capable of screening substances up to a maximum of 10,000 molecular weight to produce a non-fat solid content of from 14.5 to 30 weight percent, then homogeneously mixing 50 to 70 parts by weight of the animal milk thus obtained and 50 to 15 parts by weight of an oil or fat, and emulsifying the mixture.

The removal of low molecular weight substances may be done using a pressure higher than the osmotic pressure of the animal milk-water system using a semipermeable membrane or a molecular sieve. Advantageously, the oil or fat added to the animal milk having the low molecular weight material removed therefrom, may be animal or vegetable in origin. Moreover, depending upon the results desired, the molecular size of the membrane or sieve may be such as to pass particles less than 5,000 molecular weight and for others less than 300 molecular weight.

Other objects, features and advantageous results and advantages may be obtained from the detailed description set forth hereinbelow.

BRIEF DESCRIPTION OF DRAWING

The single FIGURE depicts a chart plotting data from three experiments showing the whipped state retaining properties of prior art and the inventive products.

DETAILED DESCRIPTION OF PREFERRED EMBODIMENTS

The single FIGURE of the drawing, as will be explained hereinafter, shows the holding ability of shape of whipped creams with passage of time of prior art and inventive products. Experiment 3, showing the invention, is contrasted with Experiments 1 and 2, as control. Table 4 shows the summary of Experiments 1, 2 and 3.

Animal milk may include, for example, cow's milk, goat's milk, etc. Either animal milk having fat removed therefrom, or animal milk containing fat may be used, with the former being preferred. Milk solids may comprise milk proteins, lactose, ash, etc. The foregoing and other animal milks may be used singly or in combination of 2 or more kinds.

For oils and fats, either those of animal or vegetable origin may be used. It is preferred that their melting points (capillary melting points) be about 40° to −5°C. As used in the specification and claims, the terms oils and fats, may be the fats and oils themselves, or preparations containing a major proportion of oils or fats and a minor proportion of other substances, such as for example, water, salts, seasonings, etc. The latter preparations may include, for example, shortening oils, margerines, butter, etc. However, these fats, oils or preparations should preferably be tasteless and odorless and have a milk-like flavor. They may be used singly or in combination of two or more kinds of substances.

In working the present invention, part or most of the substances in animal milk having molecular weights smaller than 10,000 are removed by using a semipermeable membrane or a molecular sieve. For example, animal milk containing solids to the same degree as that of animal milk, is held in contact with water through the interposition of a semipermeable membrane. There is applied to the milk phase of the system, a pressure higher than the osmotic pressure of the system. Lactose, ash and other substances which are of low molecular weight (for example; lactose, 352; tristearin, 891; etc) may be transferred to the water phase. Instead of employing a semipermeable membrane, low molecular weight components may be screened and removed by pouring animal milk through a molecular sieve, for example, SEPHADEX G-50 (manufactured by Pharmacia Fine Chemicals AB, Sweden). The semipermeable membrane and molecular sieve should be selected to remove molecules having molecular weights of up to 10,000 maximum. In some cases, depending upon the results desired, those effective for separating molecular weights up to 5,000 maximum may be used. In other cases, those up to 300 maximum may be used. The choice of sizes may be made by the desired quality of the whipping cream and the final whipped product desired.

In this way, the non-fat solids content of the animal milk was concentrated to about 14.5 to 30 weight percent. Amounts above and below these figures are not optimal and are not preferred.

Table 1 shown below gives an example of the chemical analysis of the product obtained by making use of a semipermeable membrane.

TABLE 1. (Examples of Analysis)

| | | Before treatment weight % | After treatment weight % | Component removed by treatment(wt%) |
|---|---|---|---|---|
| solid contents | Milk Proteins | 3.20 | 3.10 | 0.10 |
| | Milk Fats | — | — | — |
| | Lactose | 4.74 | 2.24 | 2.47 |
| | Ash | 0.74 | 0.47 | 0.27 |
| | Total | (8.65) | (5.81) | (2.84) |
| | Water | 91.35 | 34.19 | 57.16 |

TABLE 1. (Examples of Analysis)-continued

|  | Before treatment weight % | After treatment weight % | Component removed by treatment(wt%) |
|---|---|---|---|
| Yields | 100.00 | 40.00 | 60.00 |

Notes:
(1) "Before treatment" means animal milk prior to concentration of solids.
(2) "After treatment" means after concentration of solids by removal of low molecular weight solids using a semi-permeable membrane.
(3) "Component removed by treatment" means the quantity of solids removed by dialysing.
(4) The weight percent are based on the original water and solids content prior to separation of low molecular weight solids.

The following conditions were employed to separate the low molecular weight substances from animal milk. The dialysis used a water-animal milk system with a semipermeable membrane therebetween. The pressure was applied to the milk phase.

| (1) | Pressure applied | 4 to 5 atmospheres. |
|---|---|---|
| (2) | Period of dialysing treatment | About 5 hours. |
| (3) | Properties of semipermeable membrane: | |
|  | Maximum pressure | 20 kg/cm$^2$ |
|  | Capacity of treatment (semi-permeable membrane) (standard-city drinking water) | 5,500 l/m$^2$, 24 hours |
|  | Percentage of dialysis of sodium | 100 wt. % |
|  | Percentage of dialysis of potassium | 100 wt. % |
|  | Percentage of dialysis of casein | 0 wt % |
| (4) | Temperature of animal milk during the process of dialysis | 20°C |

The low molecular weight materials were removed to the degree shown in above Table 1.

The product obtained by the above dialysis, that is the animal milk with c8 the low molecular weight material partially or mostly removed, was then mixed in an amount of 50 to 70 parts by weight with 50 to 15 parts by weight of an oil or fat, and then homogenized and emulsified. 57

In this manner, the desired whipping cream was obtained. This product was suitable for whipping by itself or with the addition of appropriate amounts of sugar, perfumery, etc.

The present invention produced many surprising and outstanding results, the major ones of which are discussed hereinbelow.

As compared with conventional prior art products, in which fresh cream only is used and in which the fat content is about 50 to 52 weight percent, the fat content of this inventive product is surprisingly small, being about 35 to about 48 weight percent at a maximu. Furthermore, the content of proteins, lactose, ash, etc are high, in this inventive product. Explaining in detail, the content of protein in the obtained product is relatively increased against the animal milks used as raw material, and the absolute content of lactose, ash, etc, are increased relatively against the protein so obtained. Accordingly, the taste of products produced by the inventive method is not unpleasantly thick as are prior art products. In fact, advantageously, the inventive product is pleasantly light in taste, thus increasing its commercial acceptability.

The content of milk solids in the inventive product is very high because during removal of low molecular weight substances, e.g. ash, lactose, etc, by for example the counter penetration method, separation of high molecular weight substances and removal of water occur naturally at the same time. The obtained product is thus concentrated.

The two foregoing advantages are illustrated in the below Table 2, in which measurements were made from actual examples.

TABLE 2

|  | Fresh cream obtained from usual method | Product obtained from this invention |
|---|---|---|
| Fat (wt.%) | 50 | 35 |
| Milk solid (wt.%) (excluding fat content | 4.5 | 14.5 |
| Water (wt.%) | 45.5 | 50.5 |

The inventive product also excels in whipping property and the property of retaining the whipped state. Thus, the inventive product is more attractive commercially than prior art products, especially in the whipped state. The reason for this property, although one cannot say for absolute certainty, is believed to be due to the fact that the protein content of the inventive product is very high.

In addition, the inventive product has a gentle and excellent flavor. This is believed to be due to the fact that most of the ash in animal milk is removed by the dialysing treatment thereof. For example about 35 to 40 weight percent of the total ash is removed.

The foregoing and other aspects, principles, features, objects and advantages of the invention are further illustrated by the following experiments and examples, which are not to be construed in any limiting sense.

Experiment 1. (Control)

A whipped cream was obtained by whipping natural cream, separated from milk, of a fat content of 45 to 50 weight percent.

Experiment 2. (Control)

A non-dairy cream was obtained by mixing cow's milk having fat removed therefrom and natural oil in a ratio of 1:1 by weight. The cow's milk was added to colza oil followed by emulsifying the system in the presence of sucrose fatty acid ester of 1.3 wt.% and at 60 to 70°C.

Experiment 3. (Present Invention)

A whipping cream was obtained by adding 35 parts by weight of vegetable oil and 0.4 parts by weight of lecithin to 64.6 parts by weight of the product obtained by dialysing non-fat milk, using a semipermeable membrane and under conditions as set forth in Table 1 above, and then mixing, emulsifying and homogenizing at about 70°C.

Various properties of the products produced by the foregoing experiments were qualitatively measured and the results thereof are shown in below Table 3.

TABLE 3

| Experiments | 1 | 2 | 3 |
| --- | --- | --- | --- |
| Viscosity Stability | Unstable | Unstable | Stable |
| Over-run Duration | Unstable | Comparatively Stable | Stable |
| Time to Finish Whipping | Indefinite, variable to differences of materials used | Comparatively definite | Definite |
| Inversion time of phase | Too short (Inversion of phase happens frequently) | Adequate (It does not happen) | Adequate (It does not happen) |
| Shape Holding feature (Refer to Drawing) | Inferior | Comparatively good | Superior |

Note:
(1)"Viscosity Stability" denotes the viscosity of stability of the whipped cream after passage of time in storage under temperature of 20°C.
(2)"Over-run" denotes the results of volume and its stability after passage of time in storage at temperature of 20°C.

The composition of test materials obtained from the above experiments is shown below in Table 4.

TABLE 4

| Experiment | 1 | 2 | 3 |
| --- | --- | --- | --- |
| Viscosity | More than 300 cp | 250 cp | 200 cp |
| Over-run | 70 to 90% | 120 to 130% | 120 to 130% |
| (Milk) Fat | 45 to 50 wt% | 45 to 50 wt% | 36 to 40 wt% |
| Protein | 1.5 wt.% | 1.5 wt % | 5.1 wt.% |
| Ash | 0.4 wt.% | 0.4 wt % | 0.7 wt % |
| Lactose | 2.2 wt.% | 2.2 wt % | 3.8 wt.% |

In the drawing, the single FIGURE depicts a chart showing the shape holding properties of the products obtained from Experiments 1, 2 and 3, as measured against time and under conditions of 20°C temperature and 60 wt.% humidity.

A further example of an embodiment of this invention is provided hereinafter.

Non-fat milk was dialyzed at 5 atmospheres for 5 hours using as the semipermeable membrane, a film (having a thickness of 100µ, but the active part producing action of semipermeable membrane being 0.2µ thick) formed by drying and heating, in air, cellulose acetate dissolved in an organic solvent. Then, 35 parts by weight of palm kernel oil and 0.4 parts by weight of lecithin were added to 64.6 parts by weight of the product obtained by the dialysis treatment, namely, the milk having removed therefrom low molecular weight substances, and mixed, emulsified and homogenized at about 70°C.

The properties and components of the resultant whipping cream are shown in below Table 5.

TABLE 5

| | |
| --- | --- |
| Viscosity (at 10°C) (cps) | 200 to 300 |
| Over-run(see note) (V/V %) | 120 to 130 |
| Fats (wt. %) | 36 |
| Proteins (wt. %) | 5.1 |
| Lactose (wt. %) | 3.8 |
| Ash (Wt. %) | 0.7 |

Note:(Applicable to Tables 4,5)
Over-run: A numerical value given by the formula:
$$\frac{(\text{Volume after whipping}) - (\text{Volume before whipping})}{\text{Volume before whipping}} \times 100$$

The product thus produced was found to be excellent both in flavor and ability to retain the whipped state The foregoing description is for purposes of illustrating the principles of the invention. Numerous variations and modifications thereof would be apparent to the worker skilled in the art. All such variations and modifications are to be considered to be within the spirit and scope of this invention.

What is claimed is:

1. A method of preparing whipping cream comprising the steps of
   A. at least partially removing material having molecular weights less than 10,000 from animal milk using a semipermeable membrane or a molecular sieve, until there remains a non-fat solids content of between 14.5 to 30 weight percent;
   B. homogeneously mixing 50 to 70 parts by weight of the animal milk remaining after removal of said materials therefrom in step (A), and 50 to 15 parts by weight of oil or fat; and
   C. emulsifying the homogeneous mixture of step (B).
2. The method of claim 1, wherein the material removed from said animal milk has molecular weights of less than 5,000.
3. The method of claim 1, wherein the material removed from said animal milk has molecular weights of less than 300.
4. The method of claim 1, wherein said removal is by a system wherein said animal milk is held in contact with water with said semipermeable membrane interposed therebetween, and wherein a pressure is applied to the milk phase of a value greater than the osmotic pressure of said system.
5. The method of claim 1, wherein said oil or fat is animal or vegetable in origin.
6. The method of claim 5, wherein said oil or fat has a capillary melting point of between 40° and −5°C.
7. The method of claim 1, wherein said animal milk is any undenatured animal's milk, and wherein the solids are milk protein, lactose, and ash.

* * * * *